(12) United States Patent
Graham et al.

(10) Patent No.: US 8,393,381 B2
(45) Date of Patent: Mar. 12, 2013

(54) METHOD OF FORMING A CAST METAL ARTICLE

(75) Inventors: Lawrence D. Graham, Chagrin Falls, OH (US); James Barrett, Milwaukie, OR (US); Don Deptowicz, Berthound, CO (US)

(73) Assignee: PCC Airfoils, Inc., Beachwood, OH (US)

( * ) Notice: Subject to any disclaimer, the term of this patent is extended or adjusted under 35 U.S.C. 154(b) by 0 days.

(21) Appl. No.: 13/110,362

(22) Filed: May 18, 2011

(65) Prior Publication Data

US 2012/0291983 A1    Nov. 22, 2012

(51) Int. Cl.
*B22D 29/00* (2006.01)
(52) U.S. Cl. .............................. 164/132; 164/131; 134/3
(58) Field of Classification Search .................. 164/131, 164/132, 369, 516; 134/2, 3, 22.1–22.12
See application file for complete search history.

(56) References Cited

U.S. PATENT DOCUMENTS

| | | |
|---|---|---|
| 3,563,711 A | 2/1971 | Hammond, et al |
| 3,694,264 A | 9/1972 | Weingland et al |
| 4,130,157 A | 12/1978 | Miller et al. |
| 4,141,781 A | 2/1979 | Greskovich et al. |
| 4,575,330 A | 3/1986 | Hull |
| 4,637,449 A * | 1/1987 | Mills et al. ..................... 164/132 |
| 4,836,268 A * | 6/1989 | Devendra ..................... 164/132 |
| 5,332,023 A | 7/1994 | Mills |
| 5,409,871 A | 4/1995 | Dodds et al. |
| 5,679,270 A | 10/1997 | Thornton et al. |
| 6,117,612 A | 9/2000 | Halloran et al. |
| 6,932,145 B2 | 8/2005 | Frasier et al. |
| 7,520,740 B2 | 4/2009 | Wahlstrom et al. |
| 2009/0151888 A1* | 6/2009 | Wong et al. ..................... 164/137 |
| 2010/0000700 A1 | 1/2010 | Graham et al. |

* cited by examiner

*Primary Examiner* — Kevin P Kerns
*Assistant Examiner* — Kevin E Yoon
(74) *Attorney, Agent, or Firm* — Tarolli, Sundheim, Covell & Tummino LLP (57) ABSTRACT

A cast metal article is formed with an internal cavity. The internal cavity is formed by a ceramic core which is removed from the cast metal article to leave the cavity. The ceramic core is formed with a cavity to facilitate removal of the core from the cast metal article. To remove the core from the cast metal article, the cavity in the core is filled with a leaching liquid.

21 Claims, 6 Drawing Sheets

METHOD OF FORMING A CAST METAL ARTICLE

BACKGROUND OF THE INVENTION

The present invention relates to a new and improved method of forming a cast metal article which contains a cavity.

Many different cast metal articles have been formed with an internal cavity. To form the internal cavity, a core may be positioned in a mold and molten metal poured around the core. After the molten metal has solidified to form a cast metal article, the core is removed from the cast metal article. Removal of the core from the cast metal article leaves a cavity in the cast metal article.

In the past, cores have been removed from cast metal articles by exposing the cores to a leaching liquid. To facilitate the removal of cores from cast metal articles, various systems have been proposed to increase the efficiency with which a leaching liquid is utilized. Some of these systems are disclosed in U.S. Pat. Nos. 3,563,711; 3,694,264; and 5,332,023 and in U.S. Published Patent Application No. 2010/0000700. However, difficulty is still encountered in removing cores, particularly ceramic cores, from cast metal articles.

SUMMARY OF THE INVENTION

The present invention relates to a new and improved method of forming a cast metal article. The method includes forming a ceramic core having a cavity. The core is positioned in a mold. A cavity in the mold is at least partially filled with molten metal. The molten metal is solidified in the mold to form a cast metal article which at least partially contains the core. The core is removed from the cast metal article.

In accordance with one of the features of the present invention, removal of the core from the cast metal article is facilitated by filling the cavity in the core with a leaching liquid. The leaching liquid may at least partially dissolve binder material in the core and enter interstices in the core material. The leaching liquid may also at least partially dissolve other core material.

The present invention includes many different features which may be utilized together in the manner described herein. However, it is also contemplated that the various features of the invention may be utilized separately or in different combinations with each other and/or in combination with features from the prior art. For example, a ceramic core constructed in accordance with the present invention may be utilized in the formation of many different cast metal articles.

BRIEF DESCRIPTION OF THE DRAWINGS

The foregoing and other features of the invention will become more apparent upon a consideration of the following description taken in connection with the accompanying drawings wherein.

DESCRIPTION OF SPECIFIC PREFERRED EMBODIMENTS OF THE INVENTION

General Description

Figure 1:
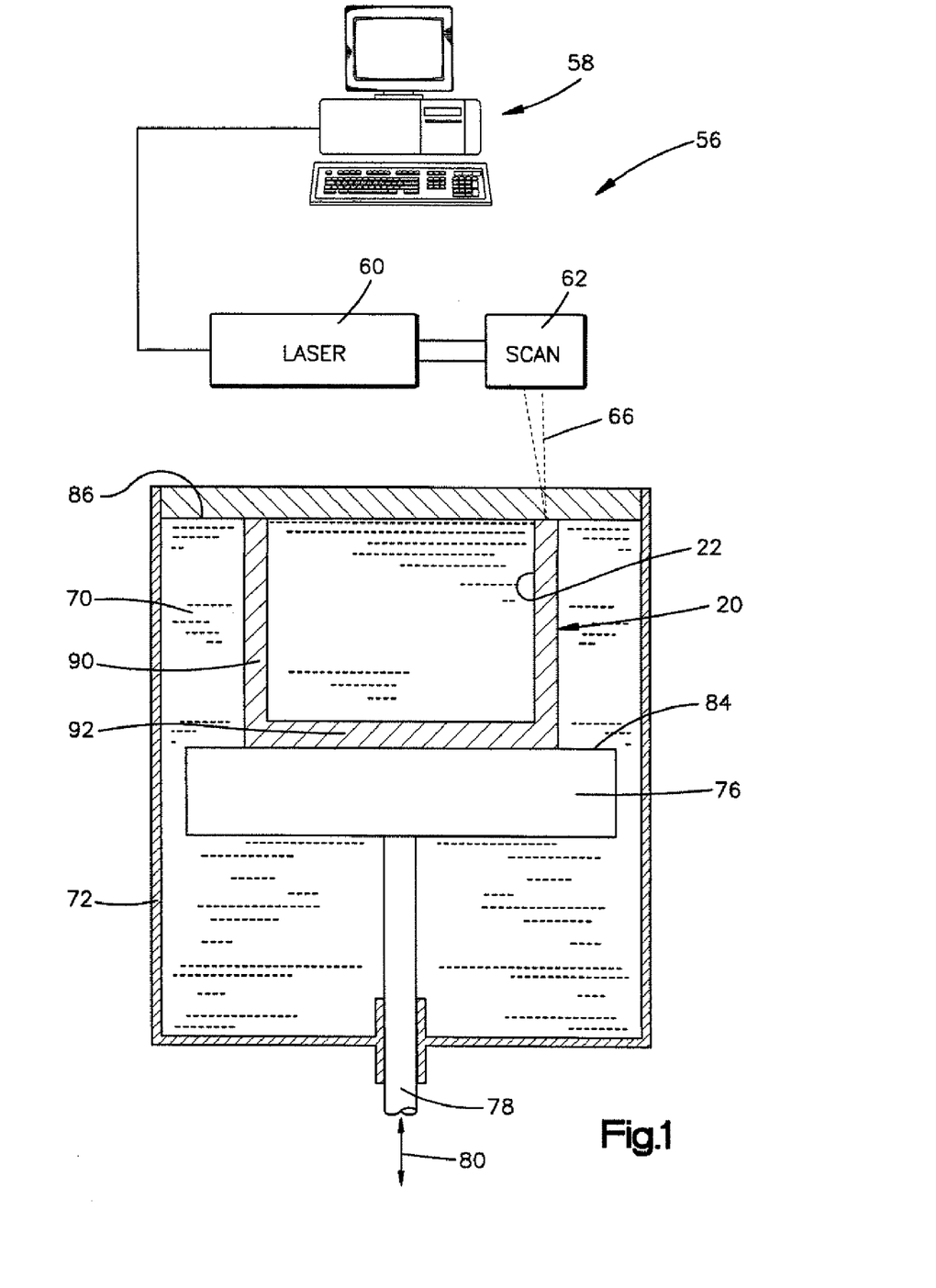
FIG. 1 is a schematic illustration depicting one manner in which a ceramic core containing a cavity is formed.

The manner in which a ceramic core 20 is formed is illustrated schematically in FIG. 1. The ceramic core 20 is formed with a cavity 22 disposed within the core. The ceramic core 20 and the cavity 22 may have any desired configuration and may be utilized to form a cavity in any desired cast metal article. The illustrated ceramic core 20 has a cylindrical configuration and contains a cylindrical cavity 22. However, the core 20 and cavity 22 may have configurations which are different than the illustrated configuration and are different from each other.

Figure 2:
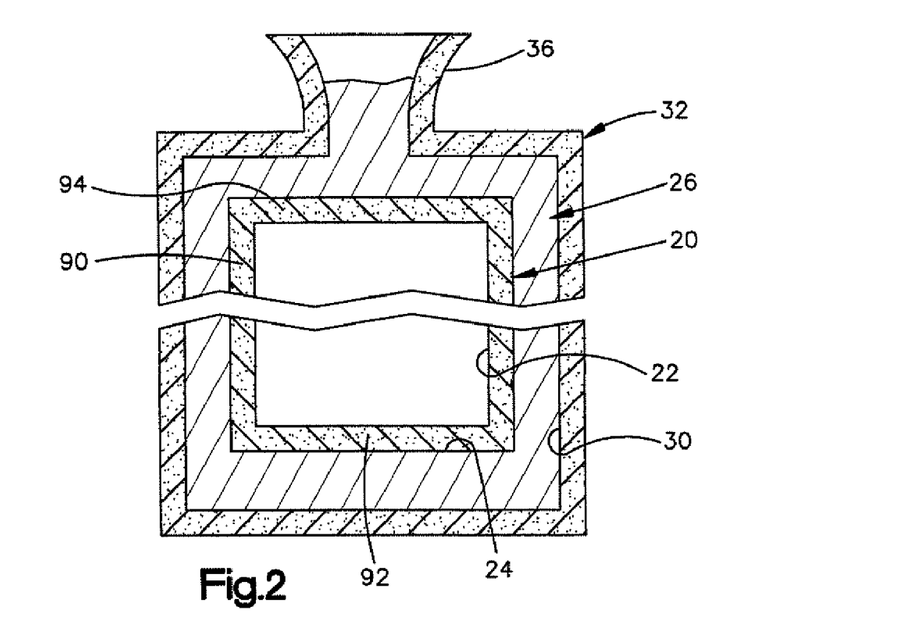
FIG. 2 is a schematic illustration, on a reduced scale, depicting the manner in which the ceramic core of FIG. 1 is utilized in association with a mold to form a cast metal article.

The manner in which the ceramic core 20 is utilized to form a cavity 24 in a cylindrical cast metal article 26 is illustrated schematically in FIG. 2. The cylindrical ceramic core 20 is positioned in a cylindrical cavity 30 formed in a ceramic mold 32. Although the ceramic mold 32 may be formed in many different ways, it is contemplated that the mold may be formed as part of an investment casting process, that is, a lost wax, process. Of course, the mold 32 may be formed in many different ways and of many different materials.

When the mold 32 is to be formed, a wax pattern is formed around the ceramic core 20. This wax pattern has a configuration corresponding to the desired configuration of the cast metal article 26, that is, a cylindrical configuration. The ceramic core 20 has a configuration corresponding to the desired configuration (cylindrical) of a cavity within the cast metal article. It should be understood that ceramic core 20, core cavity 22, and/or cast metal article 26 may have configurations other than the illustrated cylindrical configuration.

For example, the ceramic core 20, core cavity 22, and/or cast metal article 26 may have a polygonal configuration. Although the illustrated ceramic core 20, core cavity 22 and cast metal article 26 all have the same configuration, that is, a cylindrical configuration, they may have different configurations. For example, the core cavity 22 may be cylindrical while the ceramic core 20 is polygonal and the cast metal article 26 has an irregular configuration which is neither cylindrical or polygonal.

Figure 3:
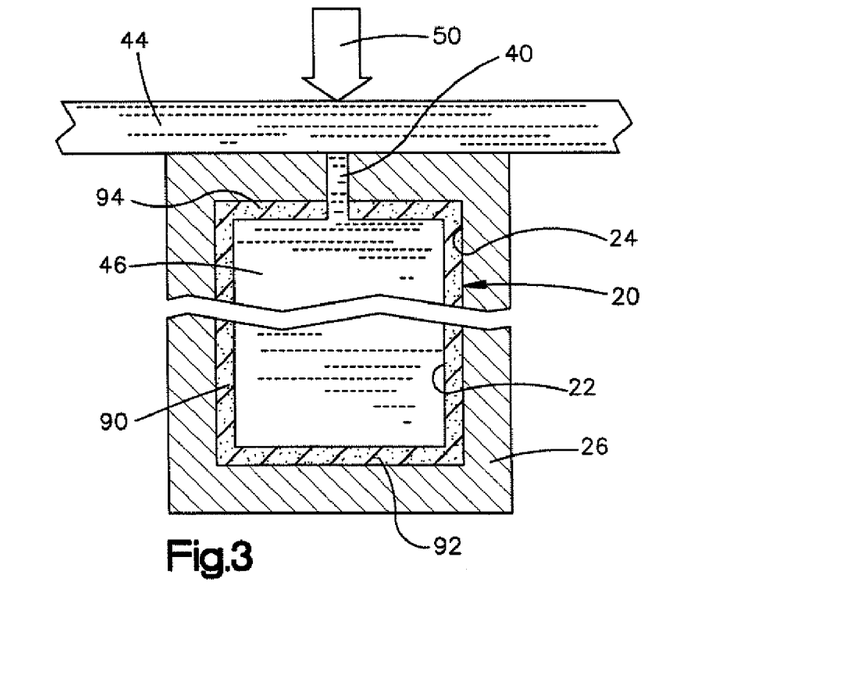
FIG. 3 is a schematic illustration, on a reduced scale, depicting the manner in which the ceramic core of FIG. 1 is removed from the cast metal article of FIG. 2 to leave a cavity in the cast metal article.

The mold 32 (FIG. 2) may be formed of a suitable ceramic material in any one of many different ways. For example, the mold 32 may be formed in the manner disclosed in U.S. Pat. No. 4,728,258 which is hereby incorporated herein in its entirety by this reference thereto. The mold 32 is formed with a pour cup 36. After the wax pattern has been removed, molten metal is poured into the pour cup 36 and mold cavity 30. The molten metal extends around the ceramic core 20 which is supported in the cavity 30 in the mold 32. The molten metal does not enter the closed cavity 22 in the core 20.

After the molten metal has solidified to form the cast metal article 26, the mold 32 is removed from around the cast metal article. In addition, solidified metal contained within the pour cup 36 is removed from the cast metal article 26. Suitable openings 40 (FIG. 3) are then formed in the cast metal article 26 and ceramic core 20 to provide access to the cavity 22 in the ceramic core.

If desired, the cavity 22 in the core 20 may be formed with one or more openings. During pouring of the molten metal which forms the article 26, the molten metal would be kept away from the openings to the cavity 22 in the core 20. Alternatively, the openings to the cavity 22 in the core 20 may be temporarily blocked during pouring of molten metal.

If desired, the ceramic core 20 may be formed with a portion which projects from the mold 32 and has one or more openings formed therein. If the ceramic core 20 is entirely contained within the mold 32 (FIG. 2) and is completely enclosed by the molten metal which forms the cast metal article 26, the cavity 22 in the ceramic core 20 is maintained isolated from the cavity 30 in the mold so that molten metal does not flow into the cavity 22 in the core 20. However, it is contemplated that the ceramic core 20 may be formed with a projecting portion having openings through which access is provided to the cavity 22 in the core 20. If this is done, the mold 32 is configured to prevent exposure of the openings in the projecting portion of the ceramic core to the molten metal so that the molten metal does not enter the cavity 22 in the ceramic core.

Once the cast metal article 22 has been removed from the mold 32, excess molten metal in the pour cup 36 is cut away and the openings 40 (FIG. 3) are formed in the cast metal article 26 and the ceramic core 20 to provide access to the empty cavity 22 within the ceramic core. Leaching liquid is conducted from a body 44 (held in a suitable container) of leaching liquid 46. The leaching liquid 46 flows from the body 44 of liquid through the opening 40 into the cavity 22 in the ceramic core 20. The leaching liquid 46 enters the ceramic core cavity 22 and permeates into the material of the ceramic core.

Permeation of the leaching liquid 46 into the ceramic material of the core 20 may be promoted by the application of fluid pressure, indicated schematically at 50 in FIG. 3, against the body 44 of leaching liquid. If desired, the fluid pressure 50 applied against the body of leaching liquid may be varied between a high pressure and a low pressure. If desired, the core cavity 22 may be sequentially connected with sources of gas at high pressure and sources of gas at low pressure (vacuum) through suitable valves in the manner described in U.S. Patent Application Publication No. 2010/0000700, entitled Method and Apparatus for Removing Core Material. The disclosure in the aforementioned U.S. Patent Application Publication No. 2010/0000700 is hereby incorporated herein in its entirety by this reference thereto.

As the fluid pressure 50 applied against the body 44 of leaching liquid is reduced to a fluid pressure below atmospheric pressure, vapor bubbles will tend to form within the material of the ceramic core 20. The reduction of fluid pressure to which the leaching liquid 46 in the ceramic core cavity 22 is exposed may be sufficient so that the vapor bubbles are formed with sufficient force to expel reactive leaching liquid from the material of the core 20 with a boiling action. This boiling action may be sufficient to promote fracturing or breaking up of undissolved core material which remains within the cavity 24 in the cast metal article 26.

When the ceramic core 22 contains a refractory metal, the leaching liquid 46 may be an acid. Although many different acids may be utilized, it is believed that it may be preferred to use nitric acid solution. In one specific example, the leaching liquid 46 may be a 70% (seventy percent) nitric acid solution. Of course, either a greater or lesser percentage of nitric acid may be utilized in the leaching liquid 46 if desired. It is contemplated that the leaching liquid 46 may be heated to promote dissolution of the material forming the ceramic core 20 and/or boiling of the leaching liquid 46.

It is also contemplated that the leaching liquid 46 may be a caustic material, such as an aqueous alkaline hydroxide. For example, the leaching liquid 46 may be sodium or potassium hydroxide. It is contemplated that the leaching liquid 46 may have any one of many known compositions. The composition of the leaching liquid 46 may be varied as a function of the variations in the composition of the ceramic core 20.

Breaking up and/or dissolution of a material forming the ceramic core 20 is promoted by having the cavity 22 in the ceramic core receive the leaching liquid 46. The cavity 22 enables the leaching liquid 46 to readily reach core material which is disposed furthest from the opening 40. In the absence of the cavity 22, a relatively long time would be required for the leaching liquid 46 to penetrate all of the material of a solid ceramic core 20.

By forming the cavity 22 in the ceramic core 20, the amount of core material which must be broken up and/or dissolved is substantially reduced. In making the cavity 22 as large as reasonably possible, the amount of core material which must be permeated by the leaching liquid 46 tends to be minimized. However, the cavity 22 should not be so large as to weaken the core 20 to an extent that it can not withstand the forces that are applied to the core during handling of the core and/or pouring of molten metal into the mold 32.

Core Formation

The core 20 (FIG. 1) is formed using solid freeform fabrication techniques. The basic operation of a solid freeform fabrication technique involves slicing a three-dimensional computer model into thin cross-sections. The result is translated into two-dimensional computer information. The two-dimensional positional data is used to control the placement of solid material.

This process is repeated as sections of the ceramic core are built up one layer at a time. The solid freeform fabrication techniques may include electron beam fabrication, fused deposition modeling, laser engineering net shaping, polyjet matrix forming, selective laser sintering, solid ground curving and/or stereolithography.

Although other techniques may be utilized to form the ceramic core 20, a known stereolithography apparatus 56 (FIG. 1) is utilized to form the ceramic core 20. The stereolithography apparatus 56 includes a computer 58 which is connected with a laser 60. A scanner system (mirrors) 62 directs a beam of radiation, that is, a laser beam 66, toward a body 70 of liquid in a container 72. Although a single scanner system 62 is illustrated, a plurality of scanner systems may be utilized. The body of liquid 70 is a photopolymer which is ultraviolet light curable.

A platform 76 is disposed in the container 72 and is connected with a piston rod 78. The piston rod 78 is connected with a suitable motor which is effective to move the piston rod and platform vertically relative to the container 72, in a manner illustrated schematically by an arrow 80 in FIG. 1. Although only a single core 20 is illustrated in FIG. 1 as being formed with the stereolithography apparatus 56, a plurality of cores 20 may be formed at the same time. A plurality of beams 66 of radiation may be directed toward the body 70 of liquid by one or more scanner systems 62 to form one or more cores on the platform 76.

When the stereolithography apparatus 56 is to be utilized to form one or more ceramic cores 20, the piston rod 78 raises the platform 76 so that the circular upper surface 84 of the platform 76 is just below the upper surface 86 of the body 70 of ultraviolet curable photopolymer resin in the container 72. The computer 56 controls exposure of the body 70 to the intermittent beam 66 of radiation. Thus, the computer 58 intermittently activates the laser 60 to form the beam 66. The scanner system 62 is then effective to direct the beam onto a portion of the upper surface 86 where a layer of the ceramic core 20 is to be formed. As was previously mentioned one or more intermittent beams 66 of radiation may be directed onto the upper surface of the body of liquid.

Where the laser beam 66 touches the upper surface 86 of the body 70 of liquid, the liquid solidifies. Although only a single scanner system 62 and laser 60 have been illustrated in FIG. 1, it should be understood that a plurality of lasers and scanner systems may be utilized to direct a plurality of laser beams toward the upper surface 86 of the body 70 of liquid. The plurality of laser beams may be utilized to form one or more cores on the platform 76.

Once a layer of the ceramic core 20 has been traced, the platform 76 is moved a small distance downward in the body 70 of liquid. A sweeper bar (not shown) may move across the surface of the previously formed layer to make sure there is an exact amount of the photosynthesis polymer on top of the last layer which was formed. The next layer is then built up upon the previous layer. In this manner, the entire ceramic core 20 is built with a multilayered construction.

As layers solidified photopolymer resin are solidified on top of each other to form the ceramic core 20, the cavity 22 is formed. The cavity 22 is formed in at least some of the layers of the core 20. A layer formed by operation of the stereolithography apparatus 56 may have a central opening which is defined by a perimeter portion of the layer. The central opening in the layer forms part of the cavity 22. Another layer formed by operation of the stereolithography apparatus 56 may be continuous and free of an opening. This layer may form an end surface of the cavity 22.

The stereolithography apparatus 46 has a construction and mode of operation which is similar to the construction and mode of operation disclosed in U.S. Pat. Nos. 4,575,330 and 7,520,740. The disclosures in the aforementioned U.S. Pat. Nos. 4,575,330 and 7,520,740 are hereby incorporated herein in their entirety by this reference thereto.

Although stereolithography apparatus 56 is described herein as being utilized to form the ceramic core 20, it is contemplated that the other solid freeform fabrication techniques may be utilized to form the ceramic core. It is also contemplated that the ceramic core 20 may be formed by methods other than freeform fabrication techniques. For example, the ceramic core 20 may be formed of a plurality of separate pieces which are interconnected to form a hollow unitary core.

It is contemplated that the ceramic core 20 may be molded as one piece. If this is done, a removable element may be used to form a space inside the core. If desired, the removable element may be formed of fugitive material, such as wax. Alternatively, the removable element may be collapsed and/or removed from the molded core as a unit. Rather than being formed as one piece, the core may be formed of two or more pieces which are interconnected to form a unitary hollow core.

If the stereolithography apparatus 56 (FIG. 1) is utilized to form the ceramic core 20, the ceramic core is formed with a layered construction. The various layers of the ceramic core adhere together to form a unitary ceramic core with a desired configuration. The layers are configured to form a cavity 22, having a desired shape, within the core 20. The layered ceramic core 20 formed with the stereolithography apparatus 56 is then cured to have the requisite structural strength and hardness. The ceramic core 20 may be cured by being fired.

To form the ceramic core 20, the body 70 (FIG. 1) of liquid contains a ceramic core resin which may include a refractory metal, silica, and/or alumina. The ceramic resin is mixed with a photocurable liquid and a photoinitiator which is responsive to the laser beam 66. The body 70 of liquid contains water to provide the liquid with a suitable viscosity. Although the body 70 of liquid may have many different compositions, it is contemplated that the body 70 of liquid may have a composition similar to any one of the compositions disclosed in U.S. Pat. No. 6,117,612. The disclosure in the aforementioned U.S. Pat. No. 6,117,612 is hereby incorporated herein in its entirety by this reference thereto.

The illustrated ceramic core 20 has a cylindrical side wall 90 (FIGS. 1-3). The cylindrical side wall 90 extends upwardly (as viewed in FIG. 1) from a circular bottom wall 92. After the side wall 90 and bottom wall 90 have been formed, the stereolithography apparatus 56 is utilized to form a circular upper wall 94 (FIG. 2) of the ceramic core 20.

A suitable opening (not shown) is formed in one of the walls 90, 92 or 94 to enable photopolymer resin 70 in the cavity 22 (FIGS. 1 and 2) to be removed from the cavity. The opening through which the photopolymer resin 70 is removed from the cavity 92 is closed before the ceramic core 20 is positioned in the mold 32. Therefore, during pouring of molten metal into the mold 32, the molten metal can not enter the cavity 22 through the opening from which the liquid 70 was removed from the cavity. This results in the cavity 22 being maintained substantially free of the molten metal.

During formation of the ceramic core 20 utilizing the stereolithography apparatus 56 (FIG. 1), the first wall of the ceramic core to be formed may be the circular bottom wall 92. The bottom wall 92 is formed of a plurality of continuous circular layers which are bonded together and are supported on the platform 76. After the bottom wall 92 has been formed, the cylindrical side wall 90 is formed. The cylindrical side wall 90 is formed of a plurality of continuous annular layers which are bonded together and which are bonded with bottom wall 92. After the side wall 90 has been formed, continuous circular layers are formed on top of the upper end of the side wall 90. These continuous layers are bonded together to form the upper wall 94 (FIG. 2) of the unitary ceramic core 20.

After the ceramic core 20 has been formed using the stereolithography apparatus 56 and after the liquid 70 has been removed from the cavity 22, the ceramic core 20 is cured to have sufficient strength to enable it to withstand forces applied against the ceramic core during forming of the cast metal article 26 (FIG. 2) around the ceramic core. Although the ceramic core 20 may be cured in other ways, it is believed that it may be desired to cure the ceramic core 20 with a sintering action which is obtained by firing of the ceramic core.

A wax pattern having a configuration corresponding to the desired configuration of the cast metal article 26, is formed around the hollow core 20. A suitable mold material is deposited over the wax pattern to form the mold 32 in the manner previously described herein. The wax pattern is then removed from the mold 32 to leave an article mold cavity 30 which extends around the core 20.

Molten metal is then poured into the article mold cavity 30. The cast metal article 26 (FIGS. 2 and 3) is formed around the ceramic core 20 upon solidification of molten metal in the mold 32. The molten metal 32 does not enter the cavity 22 in the core 20.

The molten metal may be any desired metal. It is contemplated that the molten metal may be titanium, a nickel chrome super alloy, a ferrous metal, or any other desired metal. The specific metal which is utilized to form the cast metal article 26 will depend upon the intended use for the cast metal article. It is contemplated that a cast metal article 26 having any one of many different intended uses may be formed with a cavity 24 having any desired configuration depending upon the desired construction of the cast metal article.

Once the cast metal article 26 has been formed, the core 20 is removed from the cavity in the cast metal article in the manner illustrated schematically in FIG. 3. This is accomplished by filling the cavity 22 in the ceramic core 20 with leaching liquid 46. The leaching liquid 46 dissolves binder material in the ceramic core 20 and enables particles of the ceramic core to separate from each other. The specific manner in which the leaching liquid 46 breaks down the material of the ceramic core 20 will vary as a function of variations in the composition of the ceramic core material and/or leaching liquid.

The time required for the ceramic core 20 to break down under the influence of the leaching liquid 46 is decreased by having the cavity 22 in the ceramic core. The cavity 22 enables the leaching liquid 46 to quickly contact a relatively large surface area of the core, that is, the entire interior surface area of a cavity 22. By exposing a relatively large area of the ceramic core 20 to the leaching liquid 46, the time is minimized for the leaching liquid to break down the ceramic core and enable it to be removed from the cavity 24 in the cast metal article 26. In addition, the time required for the ceramic core to break down is decreased by forming ceramic core with relatively thin side, bottom and/or upper walls 90, 92 and 94. Once the leaching liquid 46 and the residue from the ceramic core 20 have been removed from the cavity 24 in the cast metal article 26, the opening 40 which provides access to the interior of the cavity 24 in the cast metal article may be closed.

The illustrated ceramic core 20 and cavity 22 have cylindrical configurations. However, it is contemplated that the ceramic core 20 and/or cavity 22 may have any desired configuration. For example, the ceramic core 20 and/or cavity 22 may have a polygonal configuration. Alternatively, the ceramic core 20 and/or cavity 22 may have an irregular configuration which is neither cylindrical or polygonal.

Figure 4:
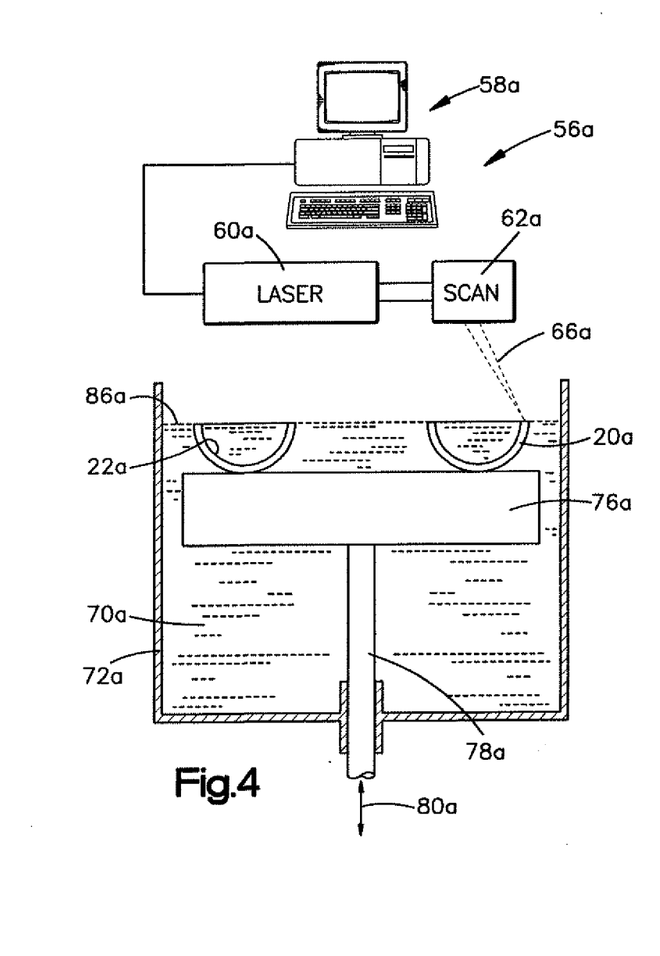
FIG. 4 is a schematic illustration, generally similar to FIG. 1, depicting the manner in which an annular cavity is formed in an annular ceramic core.
Figure 5:
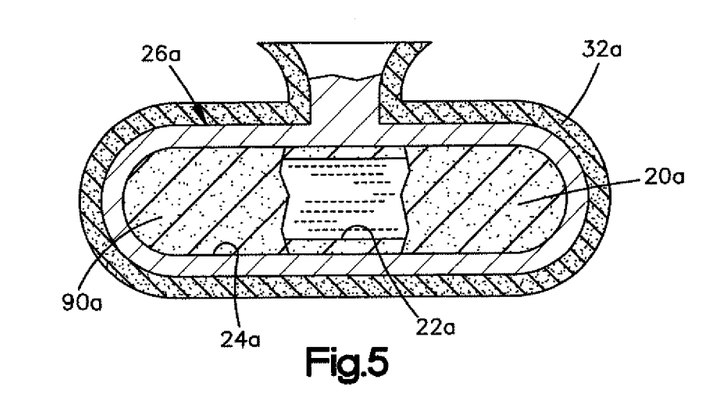
FIG. 5 is a schematic illustration, generally similar to FIG. 2, illustrating, on an enlarged scale, how the ceramic core of FIG. 4 is utilized in association with a mold to form a cast metal article.
Figure 6:
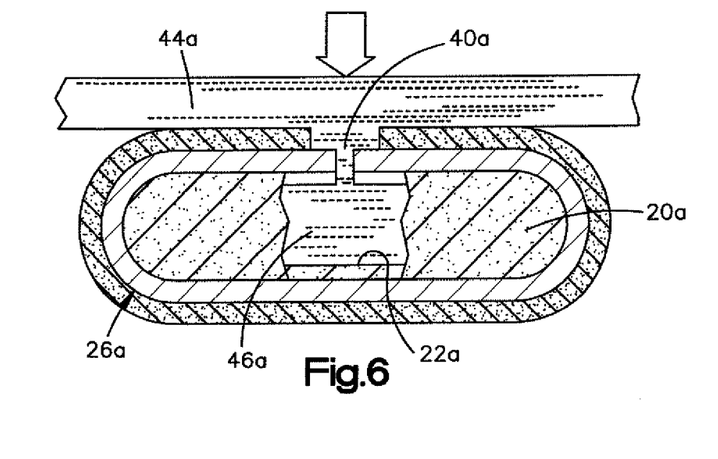
FIG. 6 is a schematic illustration, generally similar to FIG. 3, depicting the manner in which the ceramic core of FIG. 4 is removed from the cast metal article of FIG. 5 to leave a cavity in the cast metal article.

Embodiment of FIGS. 4-6

In the embodiment of the invention illustrated in FIGS. 1-3, the ceramic core 20 has a cylindrical configuration. In the embodiment of the invention illustrated in FIGS. 4-6, the ceramic core has a ring shaped configuration, specifically, a toroidal configuration. Since the embodiment of the invention illustrated in FIGS. 4-6 is generally similar to the embodiment of the invention illustrated in FIGS. 1-3, similar numerals will be utilized to identify similar components, the suffix letter "a" being added to the numerals of FIGS. 4-6 to avoid confusion.

A ceramic core 20a (FIGS. 4-6) has a ring shaped configuration and is formed using stereolithography apparatus 56a (FIG. 4). The stereolithography apparatus 56a includes a computer 58a which is connected with a laser 60a and scanner system 62a. The computer 56a effects operation of the scanner system 62a to intermittently direct one or more beams 66a of radiation onto an upper surface 86a of a body 70a of ultraviolet curable photopolymer resin held in a container 72a.

The toroidal ceramic core 20a is supported on a circular platform 76a. A piston rod 78a axially is movable, in the manner illustrated schematically by the arrow 80a, to raise and lower the platform in the body 70a of liquid. Annular layers of the ceramic core 20a are sequentially formed on the platform 76a in the manner previously discussed herein in conjunction with the embodiment of the invention illustrated in FIGS. 1-3.

Once the toroidal ceramic core 20a has been formed with a layered construction using the stereolithography apparatus 56a in the manner previously discussed, an opening (not shown) is formed in a side wall 90a (FIG. 5) of the ceramic core and liquid photopolymer resin 70a is emptied from the cavity 22a. Once this has been done, the ceramic core 20a is fired with a sintering action to give the core the requisite strength. After the access opening to the cavity 22a has been closed, the ceramic core 20a is positioned in a mold 32a (FIG. 5) and molten metal is poured into the mold. The molten metal extends around the ceramic core 20a and is solidified to form a cast metal article 26a.

The cast metal article 26a is removed from the mold 32a and the ceramic core 20a is removed from the cast metal article to leave a toroidal cavity 24 in the cast metal article. To remove the ceramic core 20a from the cast metal article 26a, an opening 40a (FIG. 6) is formed in the cast metal article 26a and the ceramic core 20a to provide access to the empty cavity 22a in the ceramic core. Leaching liquid 46a is conducted from a body 44a of leaching liquid into the circular ring shaped cavity 22a in the ceramic core 20a.

The leaching liquid 46a will at least partially dissolve binder material in the ceramic core 20a and will enter interstices in the material forming the ceramic core 20a. The material forming the ceramic core 20a may have any desired composition, including the composition previously described herein in conjunction with the embodiment of the invention illustrated in FIGS. 1-3. By providing the ceramic core 20a with the ring shaped cavity 22a, the time for dissolution or breaking up of the ceramic material forming the core 20a tends to be minimized since the surface area of the ceramic core 20a exposed to the leaching liquid tends to be maximized by the cavity 22a.

The toroidal ceramic core 20a forms a ring which has a circular central area. The ceramic core 20a forms an annular tube which extends around the open central area. It is contemplated that the ring shaped ceramic core 20a may have a different configuration if desired. For example, the ceramic core 20a may form a polygonal ring. As another example, the ceramic core 20a may have an irregularly shaped ring, such as a serpentine ring.

In the illustrated embodiment of the ceramic core 20a, the annular tube forming the body of the core has a circular cross section as viewed in a radial plane. Therefore, the ceramic core 20a is a torus. However, the annular tube forming the body of the core 20a may have a polygonal cross sectional configuration as viewed in a radial plane. The core 20a may have a toroidal polyhedron configuration if desired. Alternatively, the annular tube forming the body of the core 20a may have an irregular cross sectional configuration as viewed in a radial plane.

Although the ceramic core 20a and the cast metal article 26a of FIGS. 5 and 6 have a toroidal configuration, it is contemplated that it may have a different configuration if desired. For example, the ceramic core 20a may be formed as a ring having a having either a polygonal or oval configuration as viewed from above in FIGS. 4-6. Although the cavity 22a in the ceramic core 20a has a toroidal configuration, it is contemplated that the cavity 22a may be formed with noncircular configuration. For example, the cavity 22a may be formed as a polygonal ring.

The annular cast metal article 26a may have any one of many different configurations depending upon the use which the cast metal article is intended. It is contemplated that the cast metal article 26a may be used in many different environments where a hollow casting is desirable. It is contemplated that the hollow casting may be either large or small and may be used in connection with aircraft and/or other vehicles. As one example, the cast metal article 26a may be configured to form a housing, such as a fan casing, for use in connection with an aircraft engine.

Figure 7:
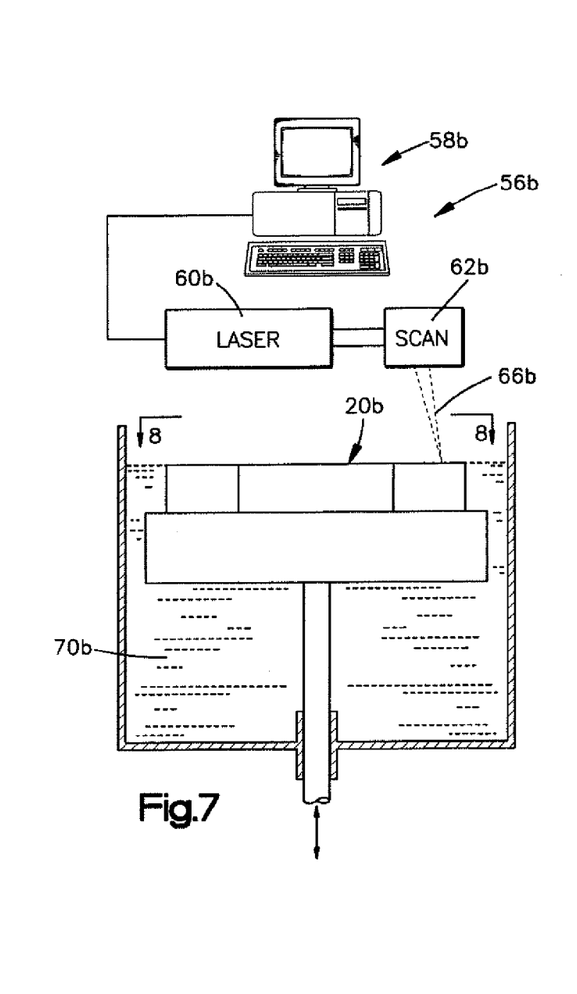
FIG. 7 is a schematic illustration, generally similar to FIGS. 1 and 4, illustrating the manner in which an irregularly shaped ceramic core containing a cavity is formed.
Figure 8:
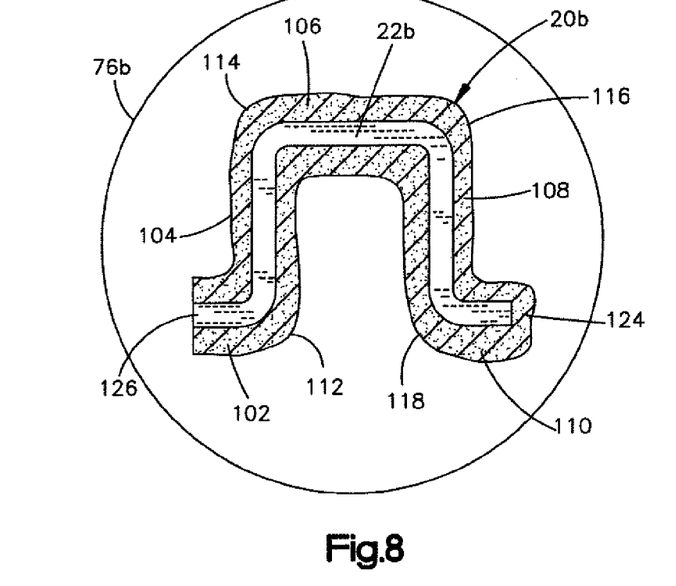
FIG. 8 is a schematic plan view, taken on an enlarged scale along the line 8-8 of FIG. 7, illustrating the irregular configuration of the ceramic core.

Embodiment of FIGS. 7 and 8

In the embodiment of the invention illustrated in FIGS. 1-6, the ceramic core has a circular configuration. In the embodiment of the invention illustrated in FIGS. 7 and 8, the ceramic core has a zig-zag configuration. Since the embodiment of the invention illustrated in FIGS. 7 and 8 is generally similar to the embodiment of the invention illustrated in FIGS. 1-6, similar numerals will be utilized to designate similar components, the suffix letter "b" being associated with the numerals of FIGS. 7 and 8 to avoid confusion.

A ceramic core 20b (FIGS. 7 and 8) has an irregular configuration and is formed with a longitudinally extending cavity 22b (FIG. 8). The cavity 22b has an irregular configuration corresponding to the configuration of the ceramic core 20b and has a longitudinal central axis which is coincident with the longitudinal central axis of the core 20b. However, the cavity 22b may be formed with a configuration which does not correspond to the configuration of the ceramic core 20b. The core 20b is formed with a stereolithography apparatus 56b (FIG. 7) having the same general construction and mode of operation as the stereolithography apparatus 56 of FIG. 1.

The stereolithography apparatus 56b includes a computer 58b, a laser 60b and a scanner system 62b. The scanner system 62b intermittently directs a beam 66b of radiation onto an upper surface of a body 70b of photopolymer resin 70b. When a laser beam 66b touches the upper surface of the body 70b of liquid, the ultraviolet curable photopolymer resin forming the liquid solidifies. After a layer of the ceramic core 20b has solidified, a platform 76b is moved a small distance downward in the body 70b of liquid. The next layer is then built up on the previous layer. In this manner, the entire ceramic core 20b is constructed using the stereolithography apparatus 56b.

The ceramic core 20b is formed as a tube having straight sections interconnected by curved sections. The ceramic core 20b may be either a close ended tube or an open ended tube. The ceramic core 20b (FIG. 8) includes straight sections 102, 104, 106, 108, and 110 (FIG. 8) which are interconnected by curved sections 112, 114, 116 and 118. The cavity 22b has straight and curved portions which are disposed in the straight and curved sections 102-118 of the ceramic core 20b.

The central axes of the straight portions of the cavity 22b are coincident with the central axes of the straight sections 102-110 of the ceramic core 20b. Similarly, the curved portions of the cavity 22b have central axes which are coincident with the central axes of the curved sections 112-118 of the ceramic core 20b. However, the cavity 22b may be formed with portions having central axes which are offset from and have a different configuration than central axes of the sections of the core 20b.

The ceramic core 20b has an outer side surface with a rectangular cross sectional configuration, as viewed in planes extending perpendicular to the central axes of the straight sections 102-110 of the ceramic core. The cavity 22b has a circular cross sectional configuration as viewed in planes extending perpendicular to the central axes of the straight sections 102-110 of the ceramic core 20b. However, it is contemplated that the cavity 22b could have a polygonal cross sectional configuration as viewed in planes perpendicular to the longitudinal central axes of the straight sections 102-110 of the ceramic core.

In the embodiment of the ceramic core 20b illustrated in FIG. 8, the curved sections 112-118 form right angles, that is, the curved sections have an included angle of 90°. However, it is contemplated that the curved sections 112-118 may have an included angle which is either greater than or less than 90°. The ceramic core 20b has a generally flat lower or bottom side (as viewed in FIG. 7) which rests on the flat upper side surface of the platform 76b. However, the ceramic core 20b may be formed so as to have a non-polygonal cross sectional configuration with an arcuate side engaging the platform 70b. Rather than being flat, the upper side of the platform 70b may be formed with recesses to facilitate forming the core 20b.

The central axis of the ceramic core 20b extends parallel to the plane of the upper surface of the platform 76b. It is contemplated that the central axis of the ceramic core 20b may extend transverse to the plane of the upper surface of the platform 76b. For example, the tubular ceramic core 20b may have a helical configuration with a cavity 22b having a helical central axis which is coincident with the helical central axis of the ceramic core 20b. Alternatively, the ceramic core 20b and cavity 22b may be formed with a spiral configuration or a stepped configuration. It is contemplated that the ceramic core 20b may be formed with any desired serpentine configuration. The cavity 22b of the tubular ceramic core 20b may have an axis which is offset from and/or is of a different configuration than the central axis of the ceramic core 20b.

In the embodiment of the ceramic core 20b illustrated in FIG. 8, an end wall 124 blocks an end of the cavity 22b opposite from an opening 126. This results in the cavity 22b having a close ended configuration. The end wall 124 blocks a flow of liquid through the cavity 22b. However, if desired, the end wall 124 may be omitted. This would result in the cavity 22b having an open ended configuration. This would enable liquid to flow through the cavity 22b.

When the ceramic core 20b is to be formed using the stereolithography apparatus 56b (FIG. 7), the scanner system 62b and computer 58b may be operated to cause the intermittent laser beam 66b to be moved either transversely to or longitudinally of a central axis of a portion of the core being formed. For example, the intermittent beam 66b of radiation may be moved along the longitudinal axes of the straight sections 102, 106 and 110 (FIG. 8) of the core 20b. The beam 66b would be moved transversely to the longitudinal axes of the straight sections 104 and 108 of the core 20b. Alternatively, the beam 66b may be moved along a zigzag path having a configuration corresponding to the irregular configuration of the core 20b. This would result in the intermittent beam 66b being moved along the irregularly configured longitudinal axis of the ceramic core 20b.

Figure 9:
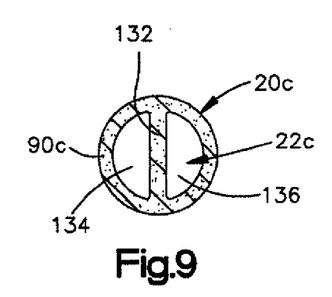
FIG. 9 is a schematic sectional view through a portion of a ceramic core having a partition which divides a cavity in the ceramic core into sections.

Embodiment of FIG. 9

In order to promote disintegration of the ceramic cores 22 of FIGS. 1-8 when they are exposed to a leaching liquid, the walls of the ceramic cores are made as thin as possible, as long as the cores have adequate structural strength. In the embodiment of the invention illustrated in FIG. 9, the core is provided with an element to strengthen the core. Since the embodiment of the invention illustrated in FIG. 9 is generally similar to the embodiments of the invention illustrated in FIGS. 1-8, similar numerals will be utilized in association with similar components, the suffix letter "c" being associated with FIG. 9 to avoid confusion.

A ceramic core 20c has a cavity 22c. The ceramic core 20c is formed using stereolithography apparatus corresponding to the stereolithography apparatus 56 of FIG. 1. The ceramic core 20c has a side wall 90c with a circular cross sectional configuration. However, the side wall 90c may be formed with a noncircular cross sectional configuration if desired.

The ceramic core 20c has an irregular overall longitudinal configuration corresponding to the zig-zag configuration of the ceramic core 20b illustrated in FIG. 8. However, it is contemplated that the ceramic core 20c may have a different configuration if desired. For example, the ceramic core 20c may have a helical configuration. As another example, the ceramic core 20c may have a serpentine configuration.

In accordance with a feature of the embodiment of the invention illustrated in FIG. 9, the ceramic core 20c is provided with a partition 132 which extends across the cavity 22c to divide the cavity into left and right (as viewed in FIG. 9) portions 134 and 136. The left and/or right portions 134 and/or 136 of the cavity may be either open ended or close ended. The partition 132 extends throughout the length of the ceramic core 20c. However, the partition 132 may extend for only a portion of the length of the core.

It is contemplated that a flow of leaching liquid may be conducted into the cavity 22c through each of the passages or portions 134 and 136. When the leaching liquid is initially conducted into the cavity 22c, the leaching liquid flows along both the left and right passage portions 134 and 136 of the cavity 22c. The leaching liquid is then effective to cause disintegration of both of the side wall 90c of the ceramic core 20c and the partition 132.

The passages or portions 134 and 136 are closed at one end. Therefore, leaching liquid can not flow through the cavity 22c. However, if desired, the passages or portions 134 and 136 may be open ended. This would enable a flow of leaching liquid to be conducted through the core 20c.

The partition 132 is effective to reinforce (strengthen) the side wall 90c of the ceramic core 20c to enable the ceramic core to withstand relatively high stresses during pouring of molten metal into a mold and/or handling of the ceramic core. If desired, the partition 132 may be replaced by a plurality of spaced apart struts or posts which extend across the cavity 22c at spaced apart locations along the cavity 22c. If reinforcing struts or posts are utilized instead of the partition 132, the posts or struts may be disposed in different orientations relative to each other. For example, if struts or posts are used instead of the partition 132 to strengthen the ceramic core 20c, one post may extend vertically (as viewed in FIG. 9) while the next adjacent post or strut extends horizontally (as viewed in FIG. 9).

It is contemplated that the ceramic core 20c may be strengthened in many different ways if desired. For example, the ceramic core 20c may be provided with internal and/or external ribs. These ribs may be used with or without reinforcing partitions, struts and/or posts. It is contemplated that the thickness of the sidewall 90c and/or partition 132 may vary along the length of the sidewall and/or partition.

Figure 10:
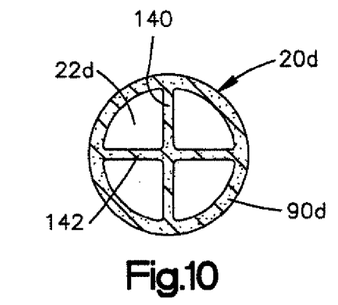
FIG. 10 is a schematic sectional view, generally similar to FIG. 9, illustrating the manner in which a plurality of partitions divide a cavity in a ceramic core into sections.

Embodiment of FIG. 10

In the embodiment of the invention illustrated in FIG. 9, a single partition 132 is utilized to strengthen the ceramic core 20c. In the embodiment of the invention illustrated in FIG. 10, a plurality of partitions are utilized to strengthen the ceramic core. Since the embodiment of the invention illustrated in FIG. 10 is generally similar to the embodiment of FIGS. 1-9, similar numerals will be utilized to designate similar components, the suffix letter "d" being associated with the numerals of FIG. 10 to avoid confusion.

A ceramic core 20d is formed using stereolithography apparatus corresponding to the stereolithography apparatus 56 of FIG. 1. The ceramic core 20d includes a side wall 90d which extends around a cavity 22d. Although the ceramic core 20d is illustrated as having a circular cross sectional configuration, it is contemplated that the ceramic core 20d may have any desired cross sectional configuration. For example, the ceramic core 20d may have a polygonal cross sectional configuration. The ceramic core 20d may have a linear longitudinal central axis. Alternatively, the ceramic core 20d may have an irregularly configured longitudinal central axis, such as a zigzag configuration or a serpentine configuration.

The cavity 22d in the ceramic core 20d has the same size and configuration throughout its length. However, some portions of the cavity 22d may have a size and/or configuration which is different than the size and/or configuration of other portions of the cavity 22d. The cavity 22d is close ended. However, the cavity 22d may be open ended if desired.

In accordance with a feature of the embodiment of the invention illustrated in FIG. 10, partitions 140 and 142 extend diametrically across the circular cross section of the cavity 20d. The partitions 140 and 142 strengthen the ceramic core 20d to enable it to withstand relatively large stresses during handling and/or pouring of molten metal into a mold with which the core is associated. The partitions 140 and 142 extend perpendicular to each other and intersect at a longitudinal central axis of the core 20d. However, the partitions 140 and 142 may be skewed at acute angles relative to each other and intersect at a location offset from the longitudinal central axis of the core 20d.

The partitions 140 and 142 may advantageously be formed with a thinner cross section than the side wall 90d to enable the partitions 140 and 142 to quickly disintegrate when a leaching liquid is poured into the cavity 22d. In the embodiment of the ceramic core 20d illustrated in FIG. 10, the ceramic core is formed as a generally cylindrical tube. The partitions 140 and 142 extend throughout the full length of the tube formed by the ceramic core 20d. However, the partitions 140 and 142 may extend for only a portion of the length of the ceramic core if desired. It is contemplated that posts, struts, and/or ribs may be used with or without one or more of the partitions 140 and 142.

Figure 11:
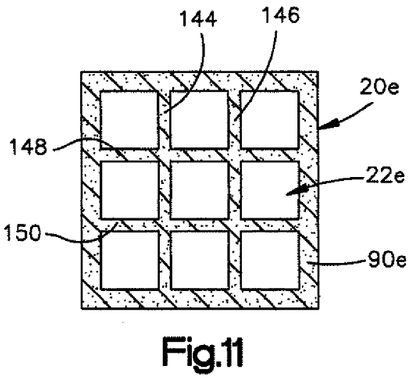
FIG. 11 is a schematic sectional view, generally similar to FIGS. 9 and 10, depicting the manner in which partitions are utilized to form an array of sections in a cavity in a ceramic core.

Embodiment of FIG. 11

In the embodiments of the invention illustrated in FIGS. 9 and 10, the ceramic core has a generally circular cross sectional configuration and partitions extend diametrically across the cavity in the ceramic core. In the embodiment of the invention illustrated in FIG. 11, the ceramic core has a polygonal cross sectional configuration. Since the embodiment of the invention illustrated in FIG. 11 is generally similar to the embodiment of invention illustrated in FIGS. 1-10, similar numerals will be utilized to designate similar components, the suffix letter "e" being associated with the numerals of FIG. 11 to avoid confusion.

A ceramic core 20e is formed using stereolithography apparatus similar to the stereolithography apparatus 56 of FIG. 1. The ceramic core 20e (FIG. 11) has a side wall 90e with a rectangular cross sectional configuration. A plurality of partitions 144, 146, 148 and 150 extend across a cavity 22e in the core 20e. The partitions 144-150 reinforce the ceramic core 20e and provide a plurality of rectangular channels or passages through which leaching liquid is conducted.

Although the partitions 144-150 have been illustrated as having the same thickness, it is contemplated that the partitions may have different thicknesses if desired. For example, the partitions 144 and 146 may be thicker than the partitions 148 and 150. In the illustrated embodiment of the invention, the partitions 144-150 have a thickness which is less than the thickness of the side wall 90e of the core 20e. If desired, the partitions 144-150 may be provided with a thickness which is the same as or greater than the thickness of the sidewall 90e. Although the partitions 144-150 extend throughout the axial extent of the cavity 22e, it is contemplated that the partitions 144-150 may extend for only a portion of the length of the cavity 22e.

It is contemplated that one or more of the partitions 144-150 may extend for only a portion of the length of the core 20e. For example the four partitions 144-150 may be provided in one portion of the core 20e while only one or two partitions may be provided in another portion of the core. If two or more partitions are provided in a portion of the core 20e, they may intersect at the center of the cavity 22e in the manner illustrated in FIG. 10 for the cavity 22d. If desired, struts, posts and/or ribs may be used in association with one or more of the partitions 144-150 of FIG. 11.

The core 20e has a linear longitudinal central axis. The core 20e may be formed with a curving longitudinal central axis if desired. For example, the core 20e may be formed with an irregular configuration, such as the configuration illustrated in FIG. 8. Alternatively, the core 20e may be formed with a helical or serpentine configuration. The cavity 22e is close ended, similar to the illustrated cavity 22b of FIG. 8. However, the cavity 22e may be open ended if desired.

Figure 12:
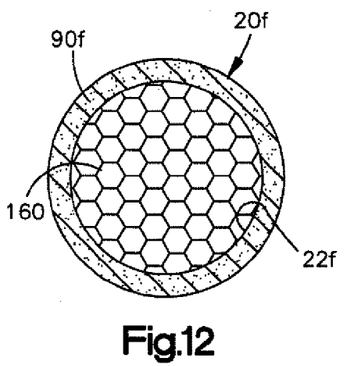
FIG. 12 is a schematic sectional view, generally similar to FIGS. 9-11, illustrating the manner in which partitions in a cavity in a ceramic core are arranged in a honeycomb structure to divide the cavity in the ceramic core into sections.

Embodiment of FIG. 12

In the embodiment of the invention illustrated in FIG. 11, a polygonal ceramic core 20e is divided into polygonal (rectangular) portions by partitions 144-150. In the embodiment of the invention illustrated in FIG. 12, a ceramic core having a circular cross section is divided into portions by partitions arranged in a polygonal (hexagonal) configuration. Since the embodiment of the invention illustrated in FIG. 12 is generally similar to the embodiments of the invention illustrated in FIGS. 1-11, similar numerals will be utilized to designate similar components, the suffix letter "f" being associated with the numerals of FIG. 12 to avoid confusion.

A ceramic core 20f has a side wall 90f having a cylindrical cross sectional configuration. The core 20f is made with a stereolithography apparatus corresponding to a stereolithography apparatus 56 of FIG. 1. A cavity 22f is formed in the ceramic core 20f.

In accordance with a feature of the embodiment of the invention illustrated in FIG. 12, the ceramic core 20f is reinforced with partitions 160 which are arranged in a honey comb pattern. The honey comb pattern forms a structure containing a plurality of hexagonal cells or passages disposed in the cavity 22f. Each of the cells is formed by six partitions 160. The cells or passages formed by the partitions 160 extend throughout the length of the ceramic core 20f.

The honey comb pattern of partitions 160 reinforces the side wall 90f of the ceramic core 20f. Although the ceramic core 20f has been illustrated in FIG. 12 as having a circular cross sectional configuration, it is contemplated that the ceramic core 20f may have a different cross sectional configuration if desired. For example, the ceramic core 20f may be formed with a polygonal cross sectional configuration.

The honey comb pattern of partitions 160 may extend for only a portion of the length of the cavity 22f. For example, if the core 20f is configured so as to have a longitudinally extending tubular configuration, the honey comb pattern of partitions 160 may be formed along only a portion of the length of the core. Reinforcing partitions may be omitted from other portions of the core 20f.

If desired, an arrangement of partitions similar to one or more of the arrangements illustrated in FIGS. 9-11 may be used in portions of the core 20f where the honey comb pattern of partitions is omitted. If desired, struts, posts, and/or ribs may be used in the portions of the core 20f where the honey comb pattern of partitions is omitted and/or where the honey comb pattern of partitions is utilized. The honey comb pattern of partitions or a different arrangement of partitions may be used with any one of the cores of FIG. 1, 4, 7, or 9-11.

The structure containing the honey comb pattern of partitions 160 may have either an open cell or a closed cell construction. If the honey comb pattern of partitions 160 has an open cell construction, the honey comb pattern of partitions may form linear passages which extend lengthways along a longitudinal central axis of the ceramic core 20f. An open cell construction would enable a flow of liquid to be conducted through the cavity 22f. Alternatively, the honey comb partitions may form nonlinear or zig-zag passages which extend lengthways along the longitudinal central axis of the ceramic core 20f. If the honey comb pattern of partitions 160 has a closed cell construction, the honey comb pattern of partitions will block a flow of liquid through the honey comb structure.

It is contemplated that the ceramic cores 20 of FIGS. 1-12 may have many different configurations and may be used in many different environments. To some extent at least, the configuration of the ceramic core 20 of FIGS. 1-12 will be determined by configuration of the cast metal article 26. The configuration of the cavity 24 to be formed in the cast metal article 26 by use of the core 20 will also be at least partially determined by the configuration of the cast metal article and the environment in which it is to be used.

Figure 13:
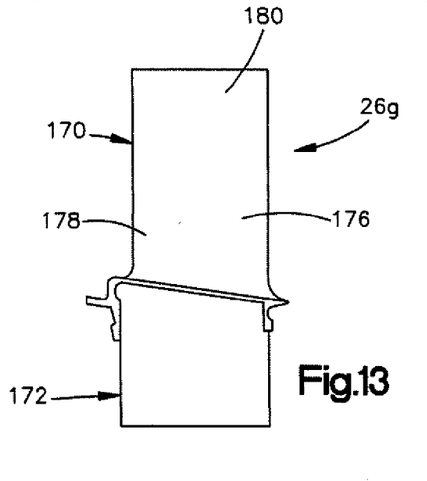
FIG. 13 is a schematic plan view of a cast metal airfoil which may be utilized in a turbine engine.
Figure 14:
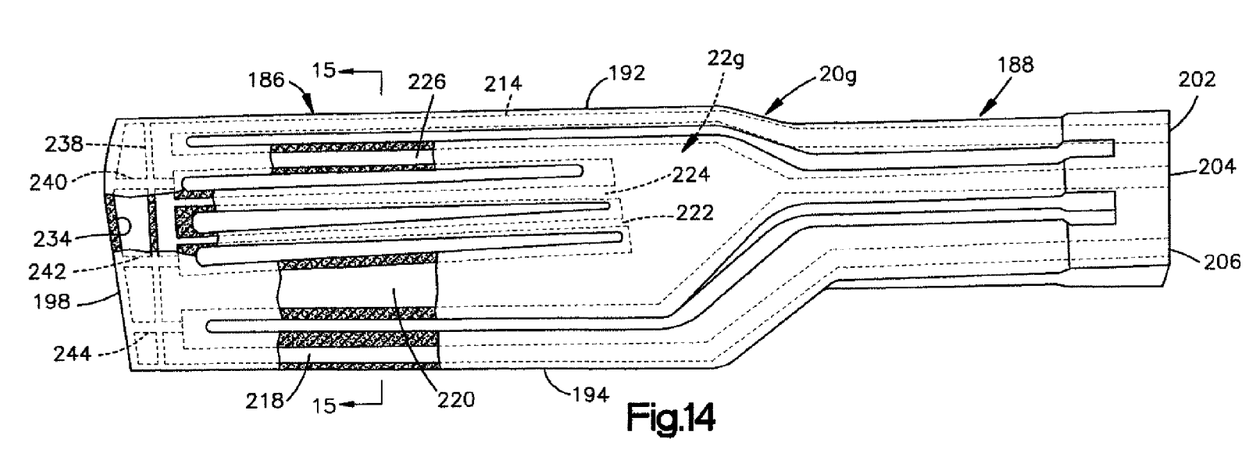
FIG. 14 is an enlarged schematic plan view of a ceramic core which may be used to form a cavity in the cast metal airfoil of FIG. 13.
Figure 15:
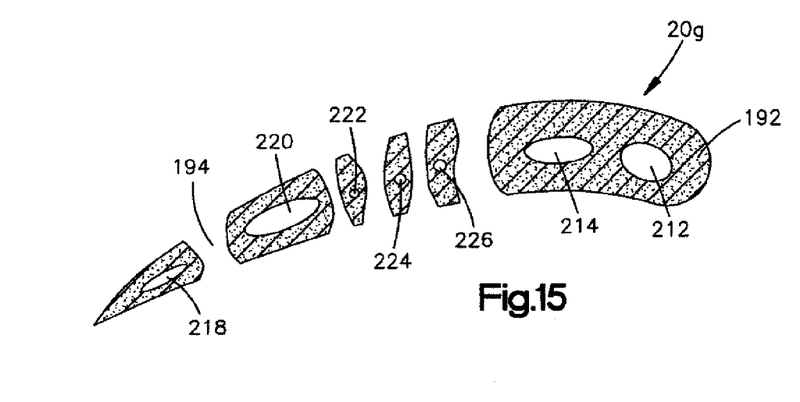
FIG. 15 is an enlarged schematic sectional view, taken generally along the line 15-15 of FIG. 14, illustrating the manner in which a cavity in the ceramic core is formed with a plurality of sections.

Embodiment of FIGS. 13-15

In the embodiment of the invention illustrated in FIGS. 13-15, the cast metal article is an airfoil and the configuration of the core which is used in forming the cast metal article is dictated by the size and configuration of the airfoil and the configuration of internal cavities, which may be passages, to be formed in the airfoil during casting of the airfoil. Since the embodiment of the invention illustrated in FIGS. 13-15 is generally similar to the embodiments of the invention illustrated in FIGS. 1-12, similar numerals will be utilized to designate similar components, the suffix letter "g" being associated with the numerals of FIGS. 13-15 to avoid confusion.

A cast metal article 26g (FIG. 13), specifically, an airfoil, includes a blade portion 170 and a root portion 172. The cast metal article 26g may be used in a stationary turbine engine or in a turbine engine which powers a vehicle, such as an aircraft. The blade portion 170 of the cast metal article 26g includes a leading edge portion 176 and a trailing edge portion 178. The blade portion 170 includes a tip end portion 180.

As is well known, the airfoil 26g may include internal cavities through which a flow of cooling fluid (air) is conducted. The airfoil 26g may have a length in a range between a few inches to about 40 inches. Of course, the airfoil 26g may have a length which is outside this illustrative range of lengths.

A ceramic core 20g for use in forming cavities in the airfoil 26g is illustrated in FIGS. 14 and 15. The ceramic core 20g has a blade portion 186 which is utilized to form cavities in the blade portion 170 (FIG. 13) of the cast metal airfoil 26g. In addition, the ceramic core 20g (FIG. 14) includes a root portion 188 which forms cavities in the root portion 172 (FIG. 13) of the cast metal airfoil 26g. The ceramic core 20g will have a length which is a function of the length of the airfoil 26g.

The cast metal airfoil 26g is formed of a nickel chrome super alloy. However, it is contemplated that other metals may be utilized to form the airfoil 26g if desired. For example, the airfoil 26g may be formed of a ferrous metal or titanium. The ceramic core 20g may contain silica and/or alumina. Of course, the ceramic core 20g may, and probably will, contain other materials. For example, the ceramic core 20g may contain a refractory metal.

The blade portion 186 (FIG. 14) of the ceramic core 20g includes a leading edge portion 192 which forms a cavity in the leading edge portion 176 (FIG. 13) of the blade portion 170 of the cast metal airfoil 26g. Similarly, the blade portion 186 (FIG. 14) of the ceramic core 20g includes a trailing edge portion 194 which forms a cavity in the trailing edge portion 178 (FIG. 13) of the cast metal airfoil 26g. The root portion 188 (FIG. 14) of the ceramic core 20g forms a cavity in the root portion 172 (FIG. 13) of the cast metal airfoil 26g. A tip end portion 198 of the ceramic core 20g (FIG. 14) forms a cavity in the tip end portion 180 (FIG. 13) of the cast metal airfoil 26g.

During use of the cast metal airfoil 26g, a flow of cooling fluid (air) is conducted from the root end portion 172 of the airfoil 26g through the blade portion 170 of the airfoil. Suitable openings may be formed at any desired location in the blade portion 170. For example, openings may be formed in the trailing edge portion 178 and/or tip end portion 180 of the airfoil to facilitate cooling of the airfoil. A return flow of cooling fluid may be conducted from the blade portion 170 back to the root portion 172 of the airfoil through the cavities formed in the airfoil by the ceramic core 20g.

It should be understood that the ceramic core 20g may have any one of many different configurations corresponding to the configuration of any one of many different cores. For example, the core 20g may have any one of the configurations disclosed in U.S. Pat. No. 5,820,774 and/or U.S. Published Patent Application Nos. 2008/0190582; 2009/0165988; and/or 2010/0129194. Of course, the ceramic core 20g may have a configuration which is different than the specific configurations illustrated in the foregoing patent and publications.

In accordance with a feature of the present invention, the ceramic core 20g is formed with a cavity 22g. The cavity 22g is formed by a network of cavities which extend between opposite end portions of the ceramic core 20g. The cavities facilitate removal of the ceramic core from the cast metal airfoil 26g.

The cavity 22g formed in the ceramic core 20g extends from the root portion 188 of the ceramic core into the blade portion 186. The cavity 22g in the ceramic core 20g has a plurality of openings 202, 204, and 206 (FIG. 14) which are formed in the root portion 188 of the ceramic core 20g. The openings 202-206 are connected in fluid communication with a network of cavities which are part of the cavity 22g and are formed in the blade portion of the airfoil. The various cavities in the network of cavities may be either close ended or open ended. Some of the cavities in the network of cavities may be close ended while other cavities are open ended.

The portion of the cavity 22g in the blade portion of the airfoil includes cavities 212 and 214 (FIG. 15) which are formed in the leading edge portion 192 of the ceramic core 20g. A cavity 218 is formed in the trailing edge portion 194 of the ceramic core 20g (FIGS. 14 and 15). In addition, cavities 220, 222, 224 and 226 (FIGS. 14 and 15) are formed in the blade portion 186 and are disposed between the leading edge portion 192 and trailing edge portion 194 of the ceramic core 20g.

A cavity 234 (FIG. 14) is formed in the tip end portion 198 of the ceramic core 20g. The cavity 234 extends between the leading edge portion 192 and trailing edge portion 194 of the ceramic core 20g. The cavities 212, 214, 218, 220, 222, 224, 226, and 234 (FIGS. 14 and 15) form a network which is part of the cavity 22g. The various cavities in the network are connected in fluid communication with both the cavity 234 in the tip end portion 198 and the openings 202, 204, and 206 in the root portion 188 of the ceramic core 20g. Therefore, a flow of leaching liquid can be conducted between the openings 202-206 in the root portion 188 of the ceramic core 20g and the cavity 234 in the tip end portion 198 of the ceramic core 20g.

A partition 238 extends from a leading end portion to a trailing end portion of the cavity 234. In addition, cross partitions 240, 242 and 244 connected with the partition 238 to further divide the cavity 234 into sections. The partitions 238, 240, 242 and 244 reinforce the tip end portion 198 of the ceramic core 20g to strengthen the tip end portion of the ceramic core. The partitions 238-244 are relatively thin and easily removed by leaching liquid. If desired, one or more of the partitions 238-244 may be omitted. If this is done, the core 20g may be formed with posts, struts or ribs, in addition to or without partitions to strengthen the core.

The cavity 234 may contain partitions disposed in a honey comb pattern similar to the pattern illustrated schematically in FIG. 12. The honey comb pattern of partitions may be used with or instead of the partitions 238-244. For example, partitions arranged in a honey comb pattern may be disposed between the partitions 240 and 242. If desired, the partitions 238-244 may be eliminated and a honey comb pattern which fills the cavity 234 may be utilized. The cavities 212, 214, 218, 220, 222, 224, and 226 (FIG. 15) may contain reinforcing elements, such as the partitions, struts, posts, and/or ribs previously described in conjunction with FIGS. 9-12 herein.

The ceramic core 20g is formed using a stereolithography apparatus, similar to the stereolithography apparatus 56 of FIG. 1. The stereolithography apparatus is utilized to form the ceramic core 20g with a layered construction in the manner similarly described in connection with the embodiments of the invention illustrated in FIGS. 1-12. After the ceramic core 20g has been formed using the stereolithography apparatus, the green ceramic core is fired to cure the core.

The fired ceramic core 20g is positioned in a mold in the manner illustrated schematically in FIGS. 2 and 5. Molten metal is then poured into the mold. The molten mold flows around the ceramic core 20g and forms a cast metal airfoil 26g. The molten metal does not enter the cavity 22g.

After the molten metal has solidified in the mold, the cast metal airfoil 26g (FIG. 13) is removed from the mold. Once the cast metal airfoil 26g containing the ceramic core 20g has been removed from the mold, the ceramic core must be removed from the cast metal airfoil. This is accomplished by exposing the material of the ceramic core 20g to a leaching liquid corresponding to the leaching liquid 46 of FIG. 3.

The leaching liquid 46 is conducted through the openings 202-206 in the ceramic core 20g (FIG. 14) and flows into the various cavities in the ceramic core. The leaching liquid flows from the opening 202 into the cavities 212 and 214 in the leading edge portion 192 of the ceramic core 20g. The leading edge portion 192 of the ceramic core 20g is disposed in the leading edge portion 176 (FIG. 13) of the blade portion 170 of the cast metal airfoil 26g.

The leaching liquid flows from the opening 204 to the cavities 220, 222, and 224. The cavities 220, 222 and 224 are disposed in a central portion of the blade portion 170 of the cast metal airfoil 26g. The leaching liquid flows from the opening 206 (FIG. 14) to the cavity 218. The trailing edge portion 194 of the ceramic core 20g is disposed in the trailing edge portion 178 (FIG. 13) of the blade portion of the cast metal airfoil 26g.

The leaching liquid flows from all three of the openings 202-206 (FIG. 14) to the cavity 234 in the tip end portion of the ceramic core 20g. The tip end portion 198 of the ceramic core 20g is disposed in the tip end portion 180 (FIG. 13) of the blade portion 170 of the cast metal airfoil 26g. The cavities 212, 214, 218, 222, 224 and 226 are all connected in fluid communication with the cavity 234 in the tip end portion 198 of the ceramic core 20g. The leaching liquid is relatively quickly able to effect disintegration of the ceramic core material forming the thin partitions 238-244.

Since the leaching liquid is exposed to the relatively large internal surface areas of the cavities 212, 214, 218, 220, 222, 224, 226 and 234 in the ceramic core 20g, the ceramic core is relatively quickly and easily disintegrated by the leaching liquid. The leaching liquid, corresponding to the leaching liquid 46 of FIG. 3, dissolves the binder material of the ceramic core 20g and enters the interstices in the core material. The leaching liquid may also at least partially dissolve other core material. If desired, the leaching liquid may be heated to further promote dissolution of the core material. Breaking down of the core material is promoted by varying the fluid pressure 50 (FIG. 3) to which the leaching liquid is exposed.

It should be understood that the cast metal articles 26 (FIGS. 2, 5, and 13) disclosed herein are merely representative of many different cast metal articles having many different configurations with which ceramic cores 20 (FIGS. 2, 6, 8-12, and 14) may be utilized. The ceramic cores 20 will, themselves, also have many different configurations, depending upon the metal article 26 with which they are associated. Regardless of the configuration of the cast metal article 26 and/or the ceramic core 20, the provision of cavities in the ceramic core 20 will decrease the amount of time required to remove the ceramic core from the cast metal article 26. This is because the provision of the cavities in the ceramic core increases the surface area to which the leaching liquid is exposed.

Although the ceramic cores 20 may be formed in many different ways, it is believed that it may be advantageous to utilize solid freeform fabrication techniques to form the ceramic cores. More specifically, it may be desirable to use the apparatus having a construction and mode of operation similar to the construction and mode of operation of the stereolithography apparatus 56 of FIG. 1. However, the ceramic cores 20 may be formed in a different manner if desired. For example, it is believed that it may be desired to form relatively large ceramic cores 20 by molding the large ceramic cores as one or more pieces.

CONCLUSION

In view of the foregoing description, it is apparent that the present invention provides a new and improved method of forming a cast metal article 26. The method includes forming a ceramic core 20 having a cavity 22. The core 20 is positioned in a mold 32. A cavity 30 in the mold 32 is at least partially filled with molten metal. The molten metal is solidified in the mold 32 to form a cast metal article 26 which at least partially contains the core 20. The core 20 is removed from the cast metal article 26.

In accordance with one of the features of the present invention, removal of the core 20 from the cast metal article 26 is facilitated by filling the cavity 22 in the core with a leaching liquid 46. The leaching liquid 46 may at least partially dissolve the binder material in the core 20 and enter interstices in other core material. The leaching liquid 46 may also at least partially dissolve the core material.

The present invention includes many different features which may be utilized together in the manner described herein. However, it is also contemplated that the various features of the invention may be utilized separately or in different combinations with each other and/or in combination with features from the prior art. For example, a ceramic core 20 constructed in accordance with the present invention may be utilized in the formation of many different cast metal articles 26. As another example, the stereolithography apparatus 56 may be used to form the ceramic core 20. Alternatively, the ceramic core 20 may be formed as one or more pieces using known techniques, such as molding.

Having described the invention, the following is claimed:

1. A method of forming a metal cast article, said method comprising the steps of forming a ceramic core containing a cavity by interconnecting layers of ceramic material to form the cavity with dimensions which are greater than a thickness of a plurality of said layers, positioning the core in a mold, at least partially filling a cavity in the mold with molten metal while maintaining the cavity in the core at least substantially free of molten metal, solidifying the molten metal in the mold to form a cast metal article which at least partially contains the core, and removing the core from the cast metal article, said step of removing the core from the cast metal article includes at least partially filling the cavity in the core with a leaching liquid while the core is at least partially disposed in the cast metal article and engaging the layers of ceramic material with the leaching liquid filling the cavity in the core.

2. A method as set forth in claim 1 said step of forming a ceramic core includes providing a body of liquid which is capable of solidification when exposed to a beam of radiation, exposing an upper surface of the body of liquid to a beam of radiation, moving the beam of radiation relative to the upper surface of the body of liquid to effect formation of a first layer of the core, moving the first layer of the core downward in the body of liquid, covering an upper surface of the first layer of the core with liquid of the body of liquid, and moving the beam of radiation relative to the body of liquid to effect formation of a second layer of the core on the first layer of the core.

3. A method as set forth in claim 1 wherein said step of removing the core from the cast metal article includes applying a first fluid pressure against the leaching liquid to urge the leaching liquid into the cavity in the core and, thereafter, exposing the leaching liquid to a second fluid pressure which is below atmospheric pressure and is less than the first fluid pressure.

4. A method as set forth in claim 1 wherein said step of forming a ceramic core containing a cavity includes forming a partition which divides at least a portion of the cavity into first and second sections, said step of forming a partition includes interconnecting a plurality of layers of ceramic material, said step of filling the cavity in the core with a leaching liquid includes conducting leaching liquid into the first and second sections of the cavity and engaging the partition with the leaching liquid.

5. A method as set forth in claim 1 wherein said step of solidifying the molten metal in the mold to form a cast metal article includes solidifying the molten metal to form a cast metal airfoil having leading and trailing edge portions, said step of forming a ceramic core includes forming a ceramic core containing a cavity having a first portion which is formed by interconnected layers of ceramic material and is disposed in the leading edge portion of the cast metal airfoil prior to removal of the core from the cast metal article and a second portion which is formed by interconnected layers of ceramic material and is disposed in the trailing edge portion of the cast metal airfoil prior to removal of the core from the cast metal article, said step of forming a ceramic core containing a cavity includes forming a ceramic core having at least a portion of a cavity formed in the first portion of the core to facilitate movement of leaching liquid into the leading edge portion of the cast metal airfoil and at least a portion of a cavity formed the second portion of the core to facilitate movement of leaching liquid into the trailing edge portion of the cast metal airfoil.

6. A method as set forth in claim 1 wherein said step of solidifying the molten metal to form a cast metal article includes forming a cast metal airfoil having a tip end portion, said step of forming a ceramic core containing a cavity includes forming a ceramic core having an end portion which is formed by interconnected layers of ceramic material and is disposed in the tip end portion of the cast metal airfoil prior to removal of the core from the cast metal article, said step of forming a ceramic core containing a cavity includes forming a ceramic core having at least a portion of a cavity formed in the end portion of the core to facilitate movement of leaching liquid into the tip end portion of the cast metal airfoil, said step of filling the cavity in the core with leaching liquid includes engaging the layers of ceramic material in the end portion of the ceramic core with the leaching liquid.

7. A method as set forth in claim 6 wherein said step of forming a cast metal airfoil includes forming a cast metal airfoil having an edge portion which is connected with the tip end portion of the cast metal airfoil, said step of forming a ceramic core containing a cavity includes forming a ceramic core having a second portion which is formed by interconnected layers of ceramic material and is disposed in the edge portion of the cast metal airfoil prior to removal of the core from the cast metal airfoil, said step of forming a ceramic core containing a cavity includes forming a ceramic core having at least a portion of a cavity in the second portion of the core to facilitate movement of leaching liquid into the edge portion of the cast metal airfoil, said step of filling the cavity in the core with leaching liquid includes engaging the layers of ceramic material in the second portion of the ceramic core with the leaching liquid.

8. A method as set forth in claim 1 wherein said step of forming a ceramic core includes forming a ceramic core having a longitudinal central axis by moving a beam of radiation in a direction transverse to the longitudinal central axis of the core and sequentially forming layers of the core as the beam of radiation moves in a direction transverse to the longitudinal central axis of the core.

9. A method as set forth in claim 1 wherein said step of forming a ceramic core includes forming a ceramic core having a longitudinal central axis by moving a beam of radiation along the longitudinal central axis of the core and sequentially forming layers of the core as the beam of radiation moves in a direction along the longitudinal axis of the core.

10. A method as set forth in claim 1 wherein said step of forming a ceramic core containing a cavity includes sequentially forming cross sectional layers of the core with portions of the cavity in the core disposed in at least some of the layers of the core.

11. A method as set forth in claim 1 wherein said step of forming a ceramic core includes forming a ring shaped core which extends around an open central area and forming a ring shaped cavity in the core with the ring shaped cavity extending around the open central area by interconnecting ring shaped layers of ceramic material, said step of filling the cavity in the core with leaching liquid includes filling the ring shaped cavity with leaching liquid and engaging the ring shaped layers of ceramic material with the leaching liquid.

12. A method as set forth in claim 1 wherein said step of forming a ceramic core includes forming a ring shaped core having a toroidal configuration by interconnecting circular layers of ceramic material and forming a circular cavity within the core, said step of filling the cavity in the core with leaching liquid includes filling the circular cavity with leaching liquid and engaging the circular layers of ceramic material with the leaching liquid.

13. A method as set forth in claim 1 wherein said step of forming a ceramic core includes forming a core which has layers of ceramic material extending around an open central portion and forming a cavity which extends around the open central portion of the core.

14. A method as set forth in claim 1 wherein said step of forming a ceramic core includes forming a core having layers of ceramic material forming a plurality of straight portions interconnected by a plurality of curving portions and forming a cavity having straight portions disposed in the straight portions of the core and having curving portions disposed in the curving portions of the core.

15. A method as set forth in claim 1 wherein said step of forming a ceramic core containing a cavity includes forming a honey comb structure with layers of ceramic material disposed in the cavity in the core.

16. A method as set forth in claim 15 wherein said step of forming a honey comb structure includes forming an open cell structure to enable liquid to be conducted through the honey comb structure.

17. A method as set forth in claim 15 wherein said step of forming a honey comb structure includes forming a closed cell structure to block a flow of liquid through the honey comb structure.

18. A method as set forth in claim 1 wherein said step of forming a ceramic core containing a cavity includes forming a close ended cavity to block a flow of liquid through the cavity.

19. A method as set forth in claim 1 wherein said step of forming a ceramic core containing a cavity includes forming an open ended cavity to enable liquid to flow through the cavity.

20. A method of forming a cast metal article, said method comprising the steps of forming a ceramic core having a root end portion and a blade portion, the blade portion of the core having first and second edge portions which are connected with a second end portion of the core which is opposite from the root end portion of the core, said step of forming a ceramic core includes interconnecting layers of ceramic material with at least some of the layers of ceramic material at least partially disposed in the first edge portion of the blade portion of the core, with at least some of the layers of ceramic material at least partially disposed in the second edge portion of the blade portion of the core, and with at least some of the layers of ceramic material disposed in the second end portion of the core, said step of interconnecting the layers of ceramic material includes forming at least a portion of a cavity in the first edge portion of the blade portion of the core, forming at least a portion of a cavity in the second edge portion of the blade portion of the core, and forming at least a portion of a cavity in the second end portion of the core, positioning the core in a cavity in a mold, said step of positioning the core in a cavity in the mold includes positioning the core in a cavity having a configuration corresponding to the configuration of an airfoil, at least partially filling the cavity in the mold with molten metal while maintaining cavities in the core at least substantially free of molten metal, solidifying the molten metal in the cavity in the mold to form a cast metal airfoil which at least partially contains the core, and removing the core from the cast metal airfoil, said step of removing the core from the cast metal airfoil includes conducting a flow of a leaching liquid from the root end portion of the core to the portion of a cavity disposed in the first edge portion of the core and engaging at least some of the layers of ceramic material disposed in the first edge portion of the blade portion of the core with the leaching liquid, conducting a flow of the leaching liquid from the root end portion of the core to the portion of a cavity disposed in the second edge portion of the core, and engaging at least some of the layers of ceramic material disposed in the second edge portion of the blade portion of the core with the leaching liquid, and conducting a flow of leaching liquid from the root end portion of the core to the second end portion of the core and engaging at least some of the layers of ceramic material disposed in the second end portion of the core with the leaching liquid.

21. A method as set forth in claim 20 wherein said steps interconnecting layers of ceramic material in the second end portion of the core and forming at least a portion of a cavity in the second end portion of the core includes forming a partition which is formed by layers of ceramic material and is effective to isolate a portion of a cavity formed in the second end portion of the core from cavities in other portions of the core, said step of conducting a flow of leaching liquid from the root end portion of the core to the second end portion of the core includes engaging the partition with the leaching liquid to effect disintegration of the partition.

\* \* \* \* \*